United States Patent Office 3,849,363
Patented Nov. 19, 1974

3,849,363
PROCESS FOR THE PRODUCTION OF HOMOGENEOUS RUBBER-SILICA MIXTURES
Günter Maass and Frederico Engel, Marl, Kreis Recklinghausen, Paul Bernemann, Haltern im Westfalen, and Harald Blümel, Hamm, near Marl, Kreis Recklinghausen, Germany, assignors to Chemische Werke Huls Aktiengesellschaft, Marl, Kreis Recklinghausen, Germany
No Drawing. Continuation of application Ser. No. 97,010, Dec. 10, 1970, which is a continuation of application Ser. No. 578,415, Sept. 9, 1966, which in turn is a continuation of application Ser. No. 131,424, Aug. 14, 1961, all now abandoned. This application Oct. 12, 1972, Ser. No. 296,755
Claims priority, application Germany, Aug. 17, 1960, C 22,161; Sept. 9, 1960, C 22,325; Dec. 15, 1960, C 22,964
Int. Cl. C08c 11/10, 11/22
U.S. Cl. 260—33.6 AQ        4 Claims

ABSTRACT OF THE DISCLOSURE

A homogeneous rubber-silica mixture is obtainable by common precipitation of synthetic rubber latex and an alkali metal silicate solution with an acid if a creamable latex, which contains an emulsifier that is only stable in the alkaline medium, is mixed with the desired amount of alkali metal silicate solution and such an amount of an aqueous neutral electrolyte solution that the electrolyte concentration in the resulting cream is between 25 and 80 g./l., and subsequently an acid is added gradually, within 10–180 minutes, to this cream, under intensive stirring, at a temperature between 0 and 30° C., to a pH value between 9 and 7. Then, the materials are heated to 80–100° C., more acid is added to reduce the pH to 3 to 2 and the resulting rubber-silica mixture is recovered.

---

This is a continuation of application Ser. No. 97,010, filed Dec. 10, 1970 (now abandoned), which was a continuation of application Ser. No. 578,415, filed Sept. 9, 1966 (now abandoned), which was a continuation of application Ser. No. 131,424, filed Aug. 14, 1961 (now abandoned).

It is already known to produce a mixture of rubber and silica by common precipitation of rubber latex and water glass or silicic acid solution by mixing the latex with the water glass and precipitating with ammonium sulfate, if desired with addition of common salt or alcohol, or by mixing the latex with a silicic acid solution and precipitating with addition of an acid. These methods have the disadvantages that only mixtures with a very low silica content of less than 10% are obtained, to which subsequently additional fillers, for example, colloidal kaolin or activated carbon must be added, and that the silica is not precipitated in a highly active form.

It has been found that a homogenous rubber-silica mixture can be obtained by common precipitation of synthetic rubber latex and an alkali metal silicate solution in the presence of a neutral electrolyte with an acid, if a creamable latex, which contains an emulsifier that is only stable in the alkaline medium, is mixed with the desired amount of alkali metal silicate solution and such an amount of aqueous neutral electrolyte solution that the electrolyte concentration in the resulting cream is between 25 and 80 g./l., preferably between 40 and 60 g./l., and subsequently an acid is added gradually within 10 to 180 minutes to this cream under intensive stirring at temperatures between 0 and 30° C. until a pH value between 9 and 7 is attained. With shorter addition periods of the acid, the electrolyte concentration must be at the upper limit of the above indicated range. The reaction mixture is eventually heated for 10 to 120 minutes to 80 to 100° C., while adjusting the pH of the solution if necessary to from 3 to 2 by additional amounts of an acid. The product is filtered off in known manner, washed and dried.

Under these conditions rubber-silica mixtures with any desired content of highly active silica can be obtained. The ratio 100 parts rubber: 100 parts silica, for example, can be easily achieved. By suspension in water it can be demonstrated that even at this ratio the rubber is evenly mixed with the silica.

Suitable latices, are for example, dispersions of copolymers of diolefines, like butadiene, and monoolefines, like styrene, acrylonitrile, acrylic acid ester and methacrylic acid ester or vinyl pyridine.

The first prerequisite for the application of this method is the use of a latex which can form a stable cream with electrolytes. By "cream" we understand a certain state of latex where the primary particles have already agglomerated to larger aggregates, but are still impalpably fine. It represents thus in its particle size an intermediate state between the latex and a coagulate and is furthermore characterized by lacking a tendency to further coagulation. This state can be accounted for as follows:

The action of the creaming agent, that is, a salt or salt-containing compound, on the latex has the result that the emulsifier adhering on the surface of the rubber particles is salted out, a process which is equivalent to a concentration reduction of the active emulsifier. The latex is therefore unstable to a certain extent, and there is an agglomeration of particles which progresses until the surface of the rubber particles has been reduced to an extent corresponding to the concentration reduction of the emulsifier. The emulsifier adhering on the surface of the rubber flakes acts as a dispersing agent and prevented caking of the individual rubber particles. When this defined cream state is so stable that the rubber particles do not cake to larger agglomerates and there is no further agglomeration on standing, heating or vigorous stirring, the cream is stable.

The duration of the stability of the cream depends on the amount of salt added. A useful latex must remain stable after addition of the amount of salt required for precipitating the silica and the amount of salt which is formed by the neutralization of the alkali metal content of the water glass during the precipitation, as long as the precipitation of the silica continues during the production of the rubber-silica mixture. This corresponds to a period from the mixing of the cream until the neutral point (pH 7 to 9) is approximately achieved.

The test of a latex for its capacity to form a stable cream is based on the conditions which are observed in the manufacture of the rubber-silica mixture. For example, a mixture is produced from a latex with a solid content of 19% and a water glass solution with a silica content of 26.1%, and an alkali metal oxide content of 8.25%, this mixture containing about 33% silica; the precipitation is to be effected in the presence of 50 g. sodium chloride/l. cream in 10 minutes at room temperature up to pH 8 with 1.5 N hydrochloric acid. From these data we can calculate the following test conditions:

(1) For 15 g. rubber are required 78.9 g. latex.
(2) For 7.5 g. silica (corresponding to 33% silica in the mixture) are required 21.3 ml. water glass.
(3) In the neutralization are formed from the alkali metal content of the water glass 4.4 g. sodium chloride.
(4) For the standardization of the cream to 50 g. sodium chloride/l. are required 28.0 ml. 20% sodium chloride solution-6.4 g. sodium chloride.
(5) The amount of acid is about 50 ml. of 1.5 N hydrochloric acid.

The liquid amounts of (2), (4) and (5) amount together to 99.3 ml., the total content as the sum of (3)

and (4) is 10.8 g. sodium chloride. In a 250 ml. beaker are charged 78.9 g. latex, mixed within 1 minute with 10.8 g. sodium chloride dissolved in 99.3 ml. water under intensive stirring and kept stirred for 10 minutes. After this time, the cream must still be stable, that is, there must be no tangible agglomerates in the suspension, and the entire suspension must pass easily through a screen with a mesh aperture of 0.5 mm. (DIN 12).

The latex must also contain an emulsifier which is only stable in an alkaline pH medium and which becomes inactive by neutralization, that is, by addition of acid up to pH 7, and losses its emulsifying capacity. To this group of emulsifiers belong primarily the alkali metal salts of fatty acids, particularly salts of carboxylic acids with 15 to 18 C-atoms, for example, palmitates, stearates and oleates or mixtures thereof, such as they are obtained, for example, in the paraffin oxidation, especially the potassium salts. The salts of disproportionate resinic acids, which also belong to the group of emulsifiers that are stable in an alkaline pH medium and which are commercially available, for example, under the name "Dresinates," are not suitable in practice because of their electrolyte sensitivity. They permit creaming only with extremely low salt concentrations and are therefore not suitable for mixtures with high silica contents. Particularly suitable, however, is the presence of a mixture of salts of fatty and resinic acids as emulsifiers, where the salts of fatty acids can vary between 25 and 99 parts of the entire amount of the emulsifier.

For the success of a precipitation the concentration in the starting suspension as well as the duration of the precipitation (acid addition time), until the approximate neutral point is attained, as well as the precipitation temperature are also decisive. Concentrations, precipitation times and temperatures, which are outside the indicated range, do not yield homogeneous rubber-silica mixtures. According to the invention, the precipitation temperatures should be between 0 and 30° C. and the precipitation time between 10 and 180 minutes. The electrolyte concentration and the precipitation time are interdependent with constant rubber- and silica-concentrations and constant temperature in the sense that longer precipitation times are required with low electrolyte concentrations. But it is not necessary to select low electrolyte concentrations with longer acid addition times, though this could be done in the sense of the foregoing dependence. With precipitation times between 10 and 180 minutes, to be observed according to the invention, the corresponding electrolyte concentrations vary between 25 and 80 g./l., preferably between 40 and 60 g./l., that is, for example at 10 minutes precipitation time (at a precipitation temperature of 20° C.), 60 g. electrolyte/l., and at 180 minutes, 40 g. electrolyte/l., if a mixture with a rubber-silica ratio of 100:50 is to be precipitated with a rubber concentration between 100 and 150 g./l. and a silica concentration between 50 and 75 g./l. As already mentioned, the precipitation time can also be 60 minutes with an electrolyte concentration of 60 g./l. It is also possible to reduce the electrolyte concentration if the precipitation temperature is also reduced at the same time. At the same rubber:silica ratio of 100:50 the concentration can be reduced from 60 g. of electrolyte per liter and 60 g. of $SiO_2$ per liter at 20° C. to 40 g. of electrolyte per liter and 60 g. of $SiO_2$ at 5° C. (By "rubber concentration" we understand here and hereafter always the solid content of the latex, converted to the dilution in the cream before the addition of the acid; the silica component in the water glass is calculated as "silica concentration.")

The rubber and silica concentrations in the cream depend on the following three components.

(1) the desired rubber-silica ratio of the mixture,
(2) the solid content of the latex to be used and
(3) the silica concentration of the water glass.

Since these three variables can be subject to great variations, it is not possible to set up general rules. With the customary solid contents of the latex between 20 and 30% and with the commercial silica content of the water glass between 25 and 28%, rubber concentrations between 50 and 200 g./l. are preferred and a silica concentration corresponding to the rubber-silica ratio desired in the mixture for example, with a rubber-silica ratio:

of 100:30=150 g. rubber/l. and 45 g. silica/l.
or 120 g. rubber/l. and 36 g./silica/l.
with 100:40=150 g. rubber/l. and 60 g. silica/l.
or 120 g. rubber/l. and 48 g. silica/l.

The more the ratio rubber-silica in the desired mixture approaches the value 1, the higher becomes the silica concentration, if we want to avoid considerable additional dilution of the cream with water, which requires understandably a higher amount of electrolyte per mixture unit. It was found that the electrolyte concentration can also be varied with the silica concentration in the cream, that is, with the high silica concentrations the electrolyte concentration can be reduced without prolonging the precipitation time and without impairing the homogeneity of the rubber-silica mixture.

The following example will illustrate these conditions:

A mixture with a rubber:silica ratio of 100:200 is to be produced. The concentrations in the cream can be standardized as follows:

(a) 90 g. rubber/l., 90 g. silica/l, 50 g. sodium chloride/l., precipitation time up to pH 8: 15 minutes.
(b) If the solid content of the latex permits: 129 g. rubber/l., 120 silica/l., 48 g. sodium chloride/l. precipitation time up to pH 8: 15 minutes.
(c) Any higher electrolyte concentration, as long as the creaming stability of the latex permits, is possible: 90 g. rubber/l., 90 g. silica//l., 60 g. sodium chloride/l., precipitation time up to pH 8: 15 minutes.

Summarizing it can be said that rubber, silica and electrolyte concentration as well as the precipitation time (acid addition time) and the precipitation temperature) depend on each other, but the dependence between the silica concentration and the electrolyte concentration and between the silica concentration and the acid addition time respectively is not so great as the dependence between the electrolyte concentration and the acid addition time and as the dependence between temperature and electrolyte concentration. For each concentration and for each acid addition time there is a lower limit that must not be exceeded if a homogenous mixture of rubber and silica is to be obtained. The upper limit is determined by the concentrations of the starting materials, the solubility of the electrolyte and the creaming stability of the latex.

It is important to add the acid to the cream in a uniform stream and to avoid local over acidifications at the inlet. This can be achieved best by atomizing or spraying the acid, if the reaction mixture is stirred at the same time intensively and evenly. The stirrer can be of any known type, for example, a Hoesch—anchor—or propeller stirrer.

When the reaction mixture is standardized with the acid to a pH of 9 to 7, it should be preferably heated for some time. The temperature is increased either directly by injecting steam or indirectly to 80 to 100° C., and the mixture is left standing at this temperature for from 10 minutes to 2 hours. Subsequently additional acid can be added at once or gradually up to a pH of 3 to 2.

A mixture, which has been prepared according to the foregoing conditions and in which the silica is contained in optimum distribution, can be recognized from the quality of the precipitating suspension after standardization of the pH value 2 to 3 by the shape and size of the particles. The particles have approximately a spherical form. With increasing silica content of the mixture, the particle size drops, for example, from 0.1 to 3 mm., at a silica content of 10% to 1 to 3 mμ at a content of 30% silica. Because of the small particle size, the product must be filtered preferably on a suction filter, a rotary filter, a centrifuge or a similar device suitable for filtering very fine materials. The washing can be effected either by repeated suspension in cold or tempered water or directly on the filter. The product is dried at temperatures between 60 and 120° C.

The production of the mixtures can also be effected continuously, by conducting the suspension through a number of vessels in which the various steps of the precipitation take place successively. It is also possible to produce oil-diluted rubber-silica mixtures, if the emulsion of a plasticizer oil is added to the latex of the precipitating suspension.

Suitable for example are the emulsions of the known oils which are suitable for use as softeners for rubber which oils consists of mixtures of aromatic, aliphatic and cycloaliphatic hydrocarbons. The oil is introduced as a water emulsion and the concentration of the emulsion is optional. Preferably a 50% emulsion is used with an addition of from 1 to 5% of an emulsifier calculated upon the oil content of the emulsion. This emulsifier must be one which is stable only in alkaline medium e.g. potassium oleate, this being essential for the homogeneous mutual precipitation of the silica and the rubber of the latex. The mixtures of oil emulsion and latex must also have a certain stability which may be determined by a preliminary test as follows:

200 g. of a synthetic rubber latex (40 g. solids content) is mixed with 40 g. of a 50% oil emulsion in a 600 ml. beaker in one minute with intensive stirring and the mixture is then stirred for another minute. 100 ml. of the mixture is transferred to a measuring tube and the time required for the separation of 1 ml. of the oil mixture is determined. The oil mixture is a very oil-rich latex water mixture of variable composition. An oil emulsion is useful if immediately at the end of the stirring no pure oil drops appear on the latex-oil-emulsion mixture and when the time required for the separation of 1 ml. of oil mixture is at least 10 minutes.

The moment of the oil addition to the latex or to the precipitate suspension depends upon the kind of emulsifier in the latex. Only such emulsifiers may be used as are stable only in alkaline medium. Particularly the salts of rosin acid salts, alkali metal salts of fatty acids having from 14 to 18 carbon atoms and mixtures thereof come into consideration. If only rosin acids salts are present as emulsifier in the latex the oil mixture can be added at any time during the precipitation so long as the pH of the suspension is greater than 7. If the latex contains an alkali metal salt of a fatty acid alone or in admixture with a rosin acid salt the oil mixture may be added only to the initial dispersion that is before the beginning of the acid addition. Preferably the performance of the mutual coagulation of the rubber, silica and oil is so carried out that the latex is mixed with suitably freshly prepared oil emulsion and then water glass, water and electrolyte solution are stirred in and then the addition of acid is started in the customary manner.

The oil absorption by the silica-rubber mixture is quantitative as is evidenced by the absence of oil droplets on the suspension at the end of the precipitation. The ratio of rubber to oil to silica acid in the mixture is optional and may vary in a wide range.

It may occasionally happen that the oil-extended mixture upon being worked up may separate into oil-rich and oil-poor fractions. This may be detected by the fact that when the mixture is suspended in water the major part sinks to the bottom while a small part remains in suspension in a flaky form. This separation can be prevented by lowering the precipitation temperature.

The oil extended mixture of the present invention produced by homogeneous precipitation has substantial advantages with respect to strength, modulus, hardness and elasticity over similar mixtures made on rolls of the same rubber and oil and highly active commercial silica filler known as "Ultrasil VN 3."

As raw materials for the silica, are used alkali metal silicate solutions, preferably water glass. The ratio sodium oxide:silica in water glass is generally 1:3.3, but, other possible ratios have no effect.

By neutral electrolytes we understand the salts of strong acids and strong bases, for example, sodium chloride, sodium sulfate, potassium chloride and potassium sulfate. As acids can be used acids of any strength, for example, mineral acids such as sulfuric acid and hydrochloric acid, lower carboxylic acids, like formic acid and acetic acid, or sulfonic acids.

As it can be seen from the examples, the vulcanizates produced from the mixtures produced according to the invention, compared to mixtures produced in a different manner from rubber and light fillers have the advantages of higher elasticity at room and higher temperature, higher strengths with equal beaking elongation as well as higher moduli, and thus better resistance to wear, with the plasticities of the mixtures being very similar. Compared to a conventionally produced mixture, for example, by mixing filler and rubber on a rolling mill or in a mixer, to obtain equal vulcanization states, it uses less vulcanizing agent and offers the possibility of using more processing or extender oil thus saving costs for obtaining equal qualities.

Rubber articles produced from mixtures, like packings and profiles, soling material and footwear, cellular articles and toys, are better in use, due to the above-mentioned improvements in their properties, and last longer, compared to articles made from preliminary mixtures or mixtues produced in conventional manner. Particularly in articles that are subjected to prolonged periodic alternating stresses, like tires and parts thereof, buffers and spring suspension elements of all types, as well as conveyor belts, V-belts, air suspensions, it is possible to utilize technically the better elasticity properties and thus the lower hysteresis values as well as the higher resistance to wear which is partly a result thereof. Particularly tire manufacturers have thus the possibility of producing tires of any color, whose visible parts, like side walls and treads, contain entirely or partly light-colored mixtures, with considerably better performances than was possible up to now by using mixtures of conventional production.

EXAMPLE 1

774 g. of a synthetic rubber latex with a solid content of 19.4%, the solid consisting of 76 parts butadiene and 24 parts styrene, which contains 8.2%; potassium stearate related to the solid as an emulsifier, are mixed with 281 g. of sodium silicate, density=1.348, $SiO_2$ content=26.1%, and subsequently 321 g. of a 20% common salt solution are added within one minute under stirring. Then 350 ml. of 1.5 N sulfuric acid are injected in 10 minutes at 20 to 22° C. up to pH 8. The mixture is heated in 15 minutes up to 90° C. and kept for 10 minutes at this temperature. Then the solution is adjusted with 190 ml. of 1.5 N sulfuric acid to pH 3. The product is washed by decanting and dried at 80° C. Silica content: 30.8%, $H_2O$ content: 2.0%.

EXAMPLE 2

661 g. of a synthetic rubber latex, formed from 76 parts butadiene and 24 parts styrene, with a solid content of 22.7% and with 8% emulsifier related to the solid, the emulsifier consisting of a mixture of 50 parts of Dresinates and 50 parts of a mixture of the potassium salts of fatty acids with 15 to 18 C-atoms, are diluted with 186 ml. water, stirred with 285 g. sodium silicate, density=1.35, $SiO_2$ content=26.3%, and subsequent 256.8 g. of 20% common salt solution are added within 1 minute. The concentrations in this cream are: 116.8 g. rubber/l., 58.4 g. silica/l, 40 g. sodium chloride/l.

The cream is adjusted within 33 minutes with 350 ml. 1.5 N sulfuric acid at 18 to 22° C., under intensive stirring to pH 8. The suspension is heated in 15 minutes to 90° C. and kept at this temperature for 10 minutes. Then it is adjusted with 170 ml. 1.5 N sulfuric acid to pH 3, filtered, washed and dried at 80° C. The silica content of the mixture is 31.9% and the water content about 2%.

EXAMPLE 3

82 kg. of a synthetic rubber latex as described in Example 2, with a solid content of 16.9% are mixed in a 300 1 V2A-stirring vessel, which is equipped with a high speed propeller stirrer and a steam jacket, with 26.9 kg. of water glass and subsequently creamed within 5 minutes with 41.5 kg. of 20% common salt solution. The concentrations in this cream are then: 100 g. rubber/l., 49.75 g. $SiO_2$/l. and 60 g. sodium chloride/l. At 20° C. 32 l. of 1:5 N sulfuric acid are injected through two Schlick nozzles under vigorous stirring. The pH value of the suspension is then about 8. The suspension is heated to 90° C., and kept for 30 minutes at this temperature. Subsequently the mixture is adjusted with 21 l. of 1.5 N sulfuric acid to pH 2, the finely-divided product is filtered off on a rotary filter and freed of the salts by suspending it three times in hot water and filtering it on the rotary filter. The filter mud is dried in the circulating air cabinet at 80° C. to a residual moisture of 2%, determined by drying at 140° C. The silica content of the mixture is 32.4%.

The mixtures A, B and C (Table 1) were produced on a laboratory rolling mill, 400/250 mm., friction 1:1.15, cooling water temperature 50° C., according to the following data:

TABLE 1

| | A | B | C |
|---|---|---|---|
| Rubber-silica mixture according to example 3 | 150 | | |
| Styrene-butadiene cold rubber | | 100 | 100 |
| Silica filler, highly active | | 50 | 50 |
| Stearic acid | 2 | 2 | 2 |
| Zinc oxide | 5 | 5 | 5 |
| Amine mixture | 2.5 | 2.5 | 2.5 |
| Ethylene glycol | 2.5 | 2.5 | 2.5 |
| Sulfur | 2 | 2 | 2 |
| N-cyclohexyl-2-benzothiazyl sulfenamide | 1.5 | 3 | 1.5 |

The amounts given here are in parts by weight. The savings in mixing time of the mixture A compared to B and C, can be 50 at 25%, depending on the mixing order. From the finished mixtures are vulcanized test flaps at 150° C., from which ring-shaped test bodies are stamped. The tests yielded the following values.

(1) Heating time, mixtures;
(2) Tensile strength, kg./cm.²;
(3) Elongation, percent;
(4) Modulus, 100%/300%, kg./cm.²;
(5) Shore hardness, 22°/75°;
(6) Rebound resilience, 22°/75°, percent;
(7) Permanent set, percent;
(8) Mooney plasticity, M1–4.

TABLE 2

| 1 | 2 | 3 | 4 | 5 | 6 | 7 | 8 |
|---|---|---|---|---|---|---|---|
| A | | | | | | | |
| 15 | 155 | 410 | 33/123 | 73/69 | 40/58 | 22 | |
| 30 | 159 | 435 | 37/121 | 73/70 | 40/58 | 23 | 90 |
| 60 | 148 | 435 | 36/113 | 73/69 | 38/57 | 21 | |
| 120 | 150 | 475 | 32/104 | 72/68 | 38/57 | 17 | |
| B | | | | | | | |
| 15 | 111 | 455 | 19/44 | 66/65 | 33/53 | 14 | |
| 30 | 108 | 440 | 22/45 | 69/45 | 33/53 | 11 | 71 |
| 60 | 111 | 450 | 22/44 | 69/65 | 33/53 | 10 | |
| 120 | 108 | 475 | 19/39 | 67/63 | 33/51 | 9 | |
| C | | | | | | | |
| 15 | 206 | 685 | 11/25 | 65/60 | 33/47 | 20 | |
| 30 | 159 | 630 | 12/26 | 63/60 | 33/50 | 16 | 74 |
| 60 | 165 | 650 | 9/25 | 61/60 | 33/50 | 14 | |
| 120 | 164 | 660 | 9/23 | 60/60 | 33/49 | 11 | |

The data in Table 2 show that even with the amount of sulfur-accelerator used in the formula B for the vulcanization of a commercial, highly active reinforcing filler containing mixture, it is not possible to obtain a modulus and elasticity increase to the extent that it was in formula A. Since a further test of the increase of the amount of sulfur-accelerator further diminishes the recognizable reduction of the tensile strength in B, it is very likely that a data-combination similar to A cannot be achieved by vulcanization variations. The same amount of sulfur accelerator used in C yields a considerable improvement of the tensile strength-permanent set properties—which can also be achieved principally in A with a corresponding reduction—but the moduli are already in an uninteresting range, and the elasticities have dropped further, compared to A.

The formulas D and E (Table 3) are compared under the same mixing conditions and the same findings apply principally as above. The comparison values are compiled in Table 4.

TABLE 3

| | D | E |
|---|---|---|
| Silica mixture according to example 3 | 150 | |
| Styrene-butadiene cold rubber | | 100 |
| Silica filler, highly active, commercial | | 50 |
| Stearic acid | 1 | 1 |
| Zinc oxide | 3 | 3 |
| Sulfur | 2 | 2 |
| Zinc salt of 2-mercaptobenzothiazol | 1.75 | 1.75 |
| Diphenyl guanidine | 1.75 | 1.75 |
| Hexamethylene tetramine | 1 | 1 |

NOTE.—Test pieces were heated at 150° C.

TABLE 4

(Heading 1 to 8 have the same meanings as in table 2.)

| 1 | 2 | 3 | 4 | 5 | 6 | 7 | 8 |
|---|---|---|---|---|---|---|---|
| D | | | | | | | |
| 15 | 197 | 510 | 39/129 | 71/68 | 43/55 | 21 | |
| 30 | 182 | 445 | 40/134 | 73/68 | 43/57 | 18 | 93 |
| 60 | 177 | 450 | 40/132 | 73/70 | 43/57 | 17 | |
| 120 | 160 | 400 | 40/133 | 73/70 | 43/57 | 11 | |
| E | | | | | | | |
| 15 | 154 | 740 | 9/24 | 65/64 | 38/48 | 18 | |
| 30 | 168 | 670 | 9/34 | 67/65 | 38/48 | 17 | 103 |
| 60 | 178 | 665 | 9/37 | 70/67 | 38/49 | 17 | |
| 120 | 156 | 640 | 15/35 | 70/58 | 39/48 | 14 | |

EXAMPLE 4

In a 4 l. beaker are charged 436 g. of a synthetic rubber latex with a solid content of 22.7% and an emulsifier, as described in Example 2, and 165.5 ml. water, 380.5 g. of a water glass with a 26% $SiO_2$ content and 247.5 g. 20% common salt solution are added successively under vigorous stirring. Through a Schlick nozzle are introduced by means of a dosing pump 510 ml. 1.5 N sulfuric acid within 16 minutes at 20 to 25° C. The resulting pH value is 7. The suspension is then heated to 90° C. and kept for 30 minutes at this temperature. Then the solution is adjusted in 6 minutes with 160 ml. 1.5 N sulfuric acid to pH 3. The finely powdered deposit is suction filtered, washed by decanting and dried for 24 hours at 80° C. The mixtures contain 50% silica.

EXAMPLE 5

666 g. of a 22.5% synthetic rubber latex having a butadiene:styrene ratio of 76:24 which contains 8%, based upon the solid content of a mixture of 50 parts of potassium Dresinate and 50 parts of potassium stearate, 508 g. of water glass containing 75 g. of silica and 192.5 g. of a 20% sodium chloride solution are cooled separately to 10° C. The cooled latex and water glass are then mixed in a 5 l. container with stirring with an anchor stirrer of 9 cm. diameter (350 revolutions per minute) and then the sodium chloride solution is added within a period of 1 minute. The concentration of the resulting cream is 30 g. of sodium chloride, 58.4 g. of silica and 116.8 g. of rubber per liter. During the subsequent precipitation the temperature is maintained at 10° C. by external cooling. In 60 minutes 350 ml. of 1.5 N sulfuric acid cooled to 10° C. is introduced through a spray nozzle and then the suspension is heated up to and held at 90° C. for 15 minutes. Finally the suspension is brought to pH 3 by the addition of 165 ml. of 1.5 N sulfuric acid. It is then stirred for 10 minutes, filtered, washed and dried. The resulting mixture consists of a powder having a silica content of 31.8%.

EXAMPLE 6

666 g. of the latex used in Example 5 are, as in Example 5, mixed with 366 g. of water glass containing 75 g. of silica and 256 g. of a 20% sodium chloride solution at 5° C. The concentration of the resulting cream is 40 g. of sodium chloride, 58.4 g. of silica and 116.8 g. of rubber per liter. The cream is brought to pH 8 by the addition of 350 ml. of 1.5 N sulfuric acid at from 5° to 8° C. in 10 minutes and the suspension is heated to 90° C. and held at this temperature for 10 minutes, then brought to pH 3 by the addition of 180 ml. of 1.5 N sulfuric acid, stirred for 10 minutes, filtered, washed and dried. The silica content of the product is 32.55%.

EXAMPLE 7

64.7 kg. of a synthetic rubber latex having the composition given in Example 5 with a solids content of 20.4% and 28.9 kg. of water glass containing 6.6 kg. of silicic acid are mixed in a 300 l. container equipped with a high speed propeller stirrer and deflecting plates and then mixed, within 2 minutes with 24.75 kg. of 20% sodium chloride solution. All solutions were precooled to 4° C. The concentration of the cream was 45 g. of sodium chloride, 60 g. of silica and 120 g. of rubber per liter. 31 l. of 1.5 N sulfuric acid precooled to 4° C. were added within 10 minutes with intensive stirring whereby the mixture was brought to pH 8. The temperature rose in this time to 11° C. The suspension was then heated to 90° C. and held at this temperature for 30 minutes. The suspension was then brought to pH by the addition of 11 l. of 1.5 N sulfuric acid and then stirred for 15 minutes. The suspension was then filtered on a rotating drum filter, reslurried twice in warm water and refiltered. The product was dried for 10 hours in a cabinet with circulating air at 80° C. The silica content of the product was 31.8% and the water content 2%.

The following mixtures A and B were prepared on a laboratory rolling mill, the parts being by weight.

TABLE 5

|  | A | B |
|---|---|---|
| Silica-rubber mixture | 150 | |
| Butadiene-styrene cold rubber of example 3 | | 100 |
| Highly active silica | | 50 |
| Stearic acid | 2 | 2 |
| Zinc oxide | 5 | 5 |
| Amine mixture | 2.5 | 2.5 |
| Ethylene glycol | 2.5 | 2.5 |
| N-cyclohexyl-2-benzothiazyl-sulfenamid | 2 | 2 |
| Sulfur | 3 | 3 |

Test flaps formed of the mixtures were vulcanized at 150° C. and ring shaped test bodies were stamped out of the vulcanized test pieces. The tests carried out on the ring shaped pieces gave the following data tabulated as follows:

(1) Heating time, minutes;
(2) Tensile strength, kg./cm.$^2$;
(3) Elongation, percent;
(4) Modulus, 100%/200%, kg./cm.$^2$;
(5) Shore hardness, 22°/75°;
(6) Rebound resilience 22°/75°, percent, and
(7) Permanent set, percent.

TABLE 6

| 1 | 2 | 3 | 4 | 5 | 6 | 7 |
|---|---|---|---|---|---|---|
| A ||||||| 
| 15 | 116 | 205 | 45/114 | 75/74 | 43/62 | 10 |
| 30 | 146 | 260 | 47/118 | 75/74 | 43/62 | 8 |
| 60 | 137 | 240 | 47/118 | 75/74 | 43/62 | 8 |
| 120 | 146 | 280 | 43/112 | 75/75 | 43/62 | 8 |
| B ||||||| 
| 15 | 159 | 565 | 25/37 | 65/65 | 36/53 | 15 |
| 30 | 148 | 500 | 24/40 | 70/67 | 36/52 | 16 |
| 60 | 124 | 490 | 25/41 | 70/68 | 35/52 | 10 |
| 120 | 134 | 520 | 25/39 | 70/67 | 34/52 | 10 |

EXAMPLE 8

4120 g. of a synthetic rubber latex having a solids content of 24.3%, made of 76 parts of butadiene and 24 parts of styrene and having a Mooney viscosity ML–4=140 and containing as emulsifier a mixture of equal parts of the potassium salt of disproportionated rosin acids and a linoleic acid free mixture of carboxylic acids having from 14 to 18 carbon atoms were mixed with intensive stirring with 1000 g. of a 50% water-oil emulsion in which the oil consisted of an aromatic-poor naphthenic oil mixture and containing 2% of potassium oleate based upon the oil content of the emulsion as emulsifier and the resulting mixture was then mixed with 3240 g. of water, 2840 g. of water glass (d=1.35) and 3875 g. of 20% sodium chloride solution. The resulting dispersion contained 55.6 g. of sodium chloride and 53.8 g. of silica per liter and the rubber-oil-silica ratio was 100:50:75. 3350 ml. of 1.5 N sulfuric acid were introduced over a period of 10 minutes at from 17 to 20° C. whereby the mixture was brought to pH 8. The suspension was heated to 90° C. and held at this temperature for 15 minutes and then treated with more acid to pH 3 and then stirred for 15 minutes. The suspension was filtered and then slurried with water and filtered repeatedly until the mixture was practically free of salts. The mixture was then dried in air at 100° C. and contained 31.5% of silica and about 1% of water.

EXAMPLE 9

5630 g. of synthetic rubber having a solids content of 19.0% which was prepared similarly to the synthetic rubber of Example 8 but had a Mooney viscosity ML–4 of only 119 was mixed with 798 g. of a 50% water emulsion of a naphthenic oil, 1535 g. of water, 2780 g. of water glass (d=1.35) and 3790 g. of a 20% solution of sodium chloride. The concentration of the resulting dispersion was 56.4 g. of sodium chloride and 54.5 g. of silica per liter and the amounts of the ingredients were calculated to give a mixture having a rubber to oil to silica ratio of 100:37.35:68.7. 3300 ml. of 1.5 N sulfuric acid were introduced at from 18 to 20° C. over a period of 10 minutes and pH 8 thus established. The further treatment of the reaction mixture was carried out as in Example 8. The product was an oil-extended rubber having a silica content of 33.4% and a water content of about 1.5%.

EXAMPLE 10

528.6 g. of the synthetic rubber latex described in Example 9 was mixed, as described in Example 9 with oil emulsion, water, water glass and sodium chloride solution so that the concentration of the starting dispersion was 40 g. of sodium chloride and 58 g. of silica per liter and the rubber:oil:silica ratio was 100:37.5:68.75. The precipitation and the working up of the mixture was carried out as in Example 9 excepting that the precipitation was carried out at from 5 to 8° C. After drying the product had a silica content of 31.8%.

Mixtures A, B, C and D as appears in the following tables were prepared from the products of Examples 8 and 9 on laboratory rolls 400/250 mm., friction ratio 1:1.15 and cooling water temperature of 50° C.

TABLE 7

| | Parts by weight | | | |
|---|---|---|---|---|
| | A | B | C | D |
| Rubber-silica mixture of example 8 | 150 | | | |
| Rubber-silica mixture of example 9 | | 150 | | |
| Styrene-butadiene cold rubber with oil, ratio 100:50 | | | 100 | |
| Styrene-butadiene cold rubber with oil, ratio 100:37.5 | | | | 100 |
| Highly active silica filler | | | 50 | 50 |
| Stearic acid | 2 | 2 | 2 | 2 |
| Zinc oxide | 5 | 5 | 5 | 5 |
| Amine mixture | 2.5 | 2.5 | 2.5 | 2.5 |
| Ethylene glycol | 2.5 | 2.5 | 2.5 | 2.5 |
| Sulfur | 3 | 3 | 3 | 3 |
| N-cyclohexyl-2-benzothiazylsulfenamid | 2 | 2 | 2 | 2 |

Test pieces of the four compositions A, B, C and D were vulcanized at 150° C. and ring shaped test pieces were stamped therefrom. Tests carried out on these test pieces gave the following results, the data being recorded under the following headings:

(1) Heating time, minutes;
(2) Tensile strength, kg./cm.$^2$;
(3) Elongation, percent;
(4) Modulus, kg./cm.$^2$, 100%, 200%, 300%;
(5) Shore hardness, 22°/75°;
(6) Rebound resiliences, percent, 22°/75°;
(7) Permanent set, percent; and
(8) Mooney plasticity, ML/4.

TABLE 8

| 1 | 2 | 3 | 100% | 200% | 300% | 5 | 6 | 7 | 8 |
|---|---|---|---|---|---|---|---|---|---|
| Product A, 4 | | | | | | | | | |
| 15 | 129 | 260 | 38 | 102 | | 66/67 | 53/62 | 10 | 54 |
| 30 | 116 | 230 | 40 | 102 | | 66/67 | 53/60 | (*) | |
| 60 | 117 | 240 | 40 | 102 | | 65/66 | 51/60 | (*) | |
| 120 | 126 | 290 | 37 | 93 | | 65/66 | 50/60 | 6 | |
| Product B, 4 | | | | | | | | | |
| 15 | 106 | 525 | 9 | 17 | 31 | 60/56 | 42/52 | 32 | |
| 30 | 73 | 425 | 9 | 18 | 34 | 60/56 | 41/52 | 15 | 41 |
| 60 | 89 | 455 | 9 | 18 | 33 | 60/57 | 40/52 | 15 | |
| 120 | 93 | 475 | 9 | 18 | 33 | 60/59 | 40/50 | 11 | |
| Product C, 4 | | | | | | | | | |
| 15 | 139 | 255 | 46 | 114 | | 70/70 | 50/60 | 10 | |
| 30 | 129 | 230 | 48 | 115 | | 70/71 | 49/60 | 7 | 61 |
| 60 | 127 | 250 | 47 | 112 | | 70/71 | 48/60 | (*) | |
| 120 | 125 | 270 | 45 | 105 | | 70/70 | 46/60 | (*) | |
| Product D, 4 | | | | | | | | | |
| 15 | 100 | 540 | 9 | 16 | 28 | 58/56 | 40/52 | 29 | |
| 30 | 83 | 470 | 9 | 16 | 30 | 59/56 | 40/52 | 17 | 36 |
| 60 | 84 | 540 | 9 | 17 | 28 | 59/55 | 38/52 | 13 | |
| 120 | 94 | 500 | 10 | 16 | 29 | 59/56 | 38/50 | 11 | |

*Sample damaged.

We claim:

1. Process for the production of a homogeneous rubber-silica mixture by stepwise common precipitation of a synthetic rubber latex consisting of copolymerisates of butadiene and styrene and an alkali metal silicate solution in the presence of a neutral electrolyte with an acid, which consists of mixing a creamable rubber latex emulsion which contains an emulsifier component comprising an emulsifying agent that is stable only in an alkaline medium, with the desired amount of alkali metal silicate solution and such an amount of aqueous neutral electrolyte solution that the concentration of added electrolyte in the resulting cream is between 25 and 80 g./l. and the concentration of rubber is from 50 to 200 grams per liter, and effecting precipitation of homogeneous rubber-silica mixture by stepwise acidification procedure consisting essentially of (a) mixing the resulting cream uniformly with an acid selected from the group consisting of mineral acids and strong organic acids at a temperature between 0 and 30° C. under intensive stirring within 10 to 180 minutes until a pH value between 9 and 7 is attained, the electrolyte concentration being with shorter acid addition times at the upper limit of the above indicated range, (b) heating the reaction mixture for 10 to 120 minutes to 80 to 100° C., then (c) adding additional acid to a pH of 3 to 2 and filtering, washing and drying the resulting mixture.

2. Process according to claim 1 in which an aqueous extender oil emulsion is added to the latex.

3. Process according to claim 2 in which the aqueous extender oil emulsion contains an emulsifying agent which is stable only in an alkaline pH range and loses its emulsifying action when subjected to an acid pH value.

4. Process according to claim 3 in which the aqueous oil emulsion is sufficiently stable that no oil separates in the form of visible drops upon the mixing thereof with the latex and the time required for the separation of 1 ml. of oil from 100 ml. of latex-emulsion mixture is at least 10 minutes.

References Cited
UNITED STATES PATENTS

| 2,912,407 | 11/1959 | Reynolds | 260—33.6 |
| 2,964,490 | 12/1960 | Howland et al. | 260—41.5 |
| 3,004,936 | 10/1961 | Howland et al. | 260—8 |
| 3,190,851 | 6/1965 | Maass et al. | 260—41.5 |
| 3,392,140 | 7/1968 | Maahs et al. | 260—41.5 |

MELVYN I. MARQUIS, Primary Examiner

R. A. WHITE, Assistant Examiner

U.S. Cl. X.R.

260—23.7 M, 42.37, 42.47, 42.55